Figure 1:
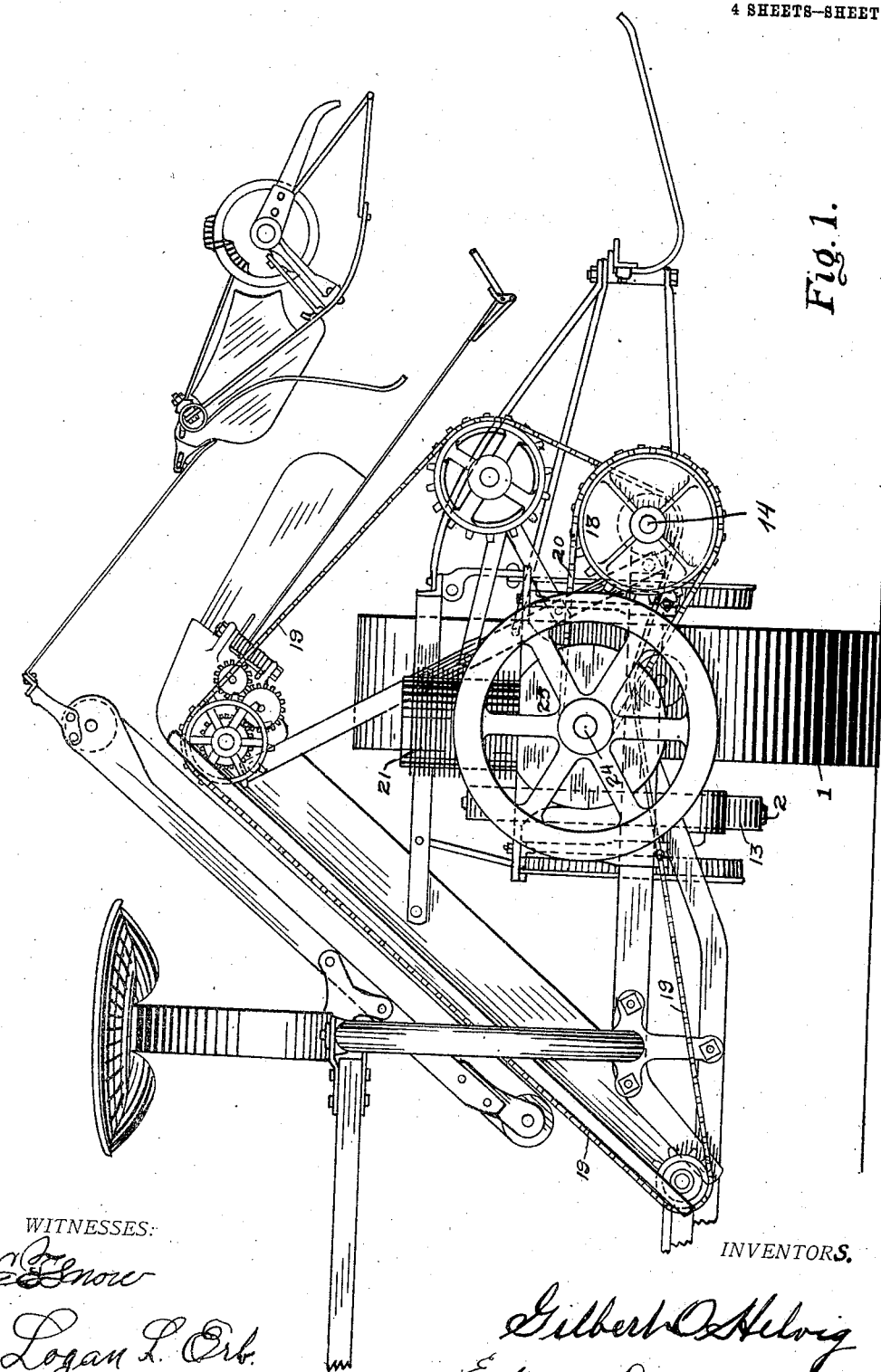

G. O. HELVIG & E. DANIELSON.
COMBINED MOTOR AND TRACTION OPERATED IMPLEMENT.
APPLICATION FILED NOV. 25, 1908.

1,023,151.

Patented Apr. 16, 1912.
4 SHEETS—SHEET 1.

WITNESSES:

INVENTORS.

G. O. HELVIG & E. DANIELSON.
COMBINED MOTOR AND TRACTION OPERATED IMPLEMENT.
APPLICATION FILED NOV. 25, 1908.

1,023,151.

Patented Apr. 16, 1912.
4 SHEETS—SHEET 3.

WITNESSES:

INVENTOR.
Gilbert O. Helvig
Edwin Danielson

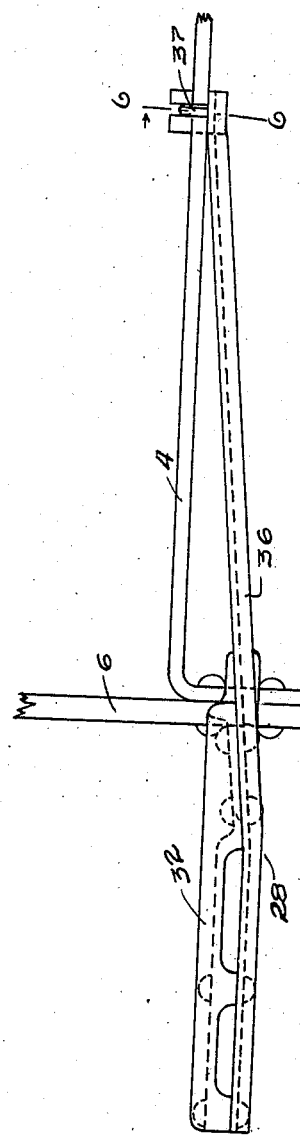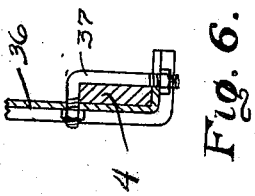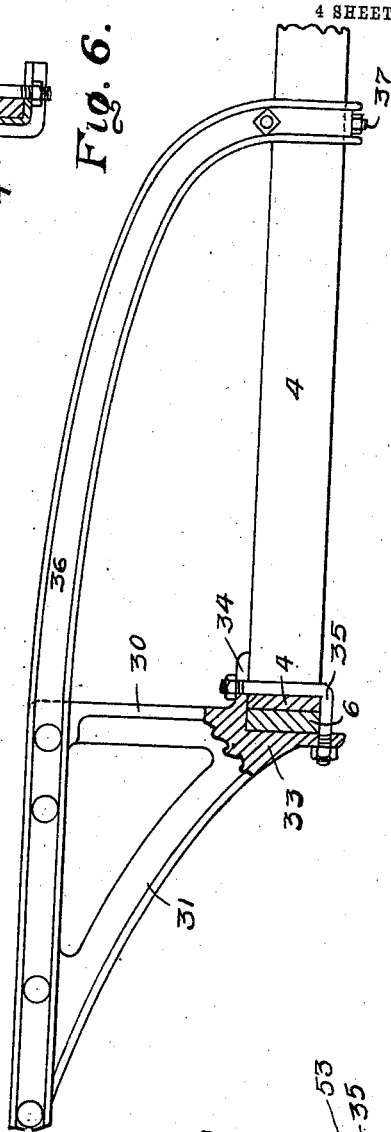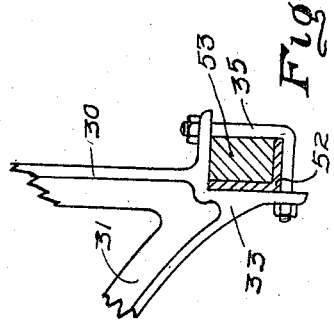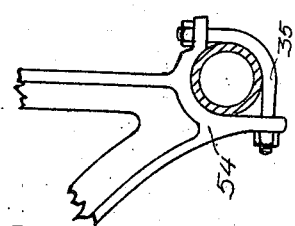

UNITED STATES PATENT OFFICE.

GILBERT O. HELVIG AND EDVEN DANIELSON, OF DAWSON, MINNESOTA, ASSIGNORS TO THE AUTOMATIC TRACTION IMPLEMENT COMPANY, OF MINNEAPOLIS, MINNESOTA, A CORPORATION.

COMBINED MOTOR AND TRACTION OPERATED IMPLEMENT.

1,023,151. Specification of Letters Patent. Patented Apr. 16, 1912.

Application filed November 25, 1908. Serial No. 464,485.

*To all whom it may concern:*

Be it known that we, GILBERT O. HELVIG and EDVEN DANIELSON, citizens of the United States, and residents of Dawson, in the county of Lac qui Parle and State of Minnesota, have invented a new and useful Combined Motor and Traction Operated Implement, of which the following is a full, clear, and concise description.

Our invention relates to the improvement of implements designed to facilitate the harvesting of agricultural products, and, while it has characteristics which render it particularly effective when applied to use in connection with the operation of binders, the invention embodies features of novelty adapting it to be advantageously utilized in connection with the operation of various other forms of harvesting machinery, such as corn harvesters, cane harvesters, potato diggers, and the like. However, it should be noted that this invention is not designed for use in connection with threshing implements or combined harvesters and threshers, and therefore should not be confused therewith. Certain classes of implements of this nature are provided with mechanically operated mechanism for cutting, conveying, and binding the grain, and in other classes the mechanically operated mechanism serves to dig, gather, convey, assort and sack the vegetables. In order that the functions of the various elements of the mechanically operated mechanisms may be properly executed, it is necessary that the requisite effectually active energy should be supplied for utilization thereby. It has been customary heretofore to operate implements of this nature from traction wheel, the motive source being furnished by draft animals. This method of operation is open to the objection that a great number of animals are required to deliver energy sufficient for operating the mechanism of the implement as well as effecting the transportation of same.

The object of this invention is to obviate these conditions by providing a separate motive means for operating the mechanism of the implement independent of the draft means, whereby fewer draft animals will be required, and enabling the speed of the mechanism to be varied according to the requirements of the conditions of the grain.

The application of this invention to all forms of side cut implements eliminates the factor of side draft; and a great advantage is gained by enabling the implement to successfully operate upon wet, soft fields of insufficient consistency for operating a traction wheel which impels the harvesting mechanism. A very similar advantage is likewise gained over any implement depending upon self-contained motive means for transportation by a traction wheel.

The invention also provides means by which the speed of the motor may be varied in accordance with the variations of the conditions of the product being harvested, independent of the speed at which the implement is being drawn by the horses. By this provision, the speed of the motor may be adequately increased when the stand of grain becomes unusually heavy, lodged or tangled. This obviates many of the difficulties encountered by the operator when the mechanism becomes clogged from sudden variations of load.

By means of this invention a crop may be harvested with greater despatch, with the utilization of but one-half the number of horses heretofore necessary, the actual labor exacted upon the horses being similar to that of hauling an idle implement over the field. However, additional means are provided for decreasing the labor of the horses, by which the motor may be caused to impel the traction wheel, during such periods as deemed advisable by the operator, to aid the horses in transporting the implement up hill or over soft ground. This special feature may be also utilized to great advantage for starting the motor, thus sparing the operator from the task of "cranking."

In the mechanical construction, we provide a design of extreme simplicity, light in weight, and of the highest mechanical efficiency. The motor is detachably mounted upon suitable brackets which are rigidly secured and braced upon the rear portion of the main frame, thus tending to more uniformly balance the implement upon the traction wheel, thereby reducing the excessive weight upon the horses' necks. However, it has been demonstrated that the weight of this attachment is not sufficient to overbalance any implement of standard make now upon the market.

To enable those skilled in the art to which our invention appertains to more thoroughly understand the construction, operation, and supereminent merits thereof, a preferred form of construction embodying the fundamental principles of our invention as applied to a Deering binder is fully set forth in the following specification and illustrated in the accompanying drawings; however, the actual scope of the invention is more particularly pointed out in the subjoined claims.

Figure 2:
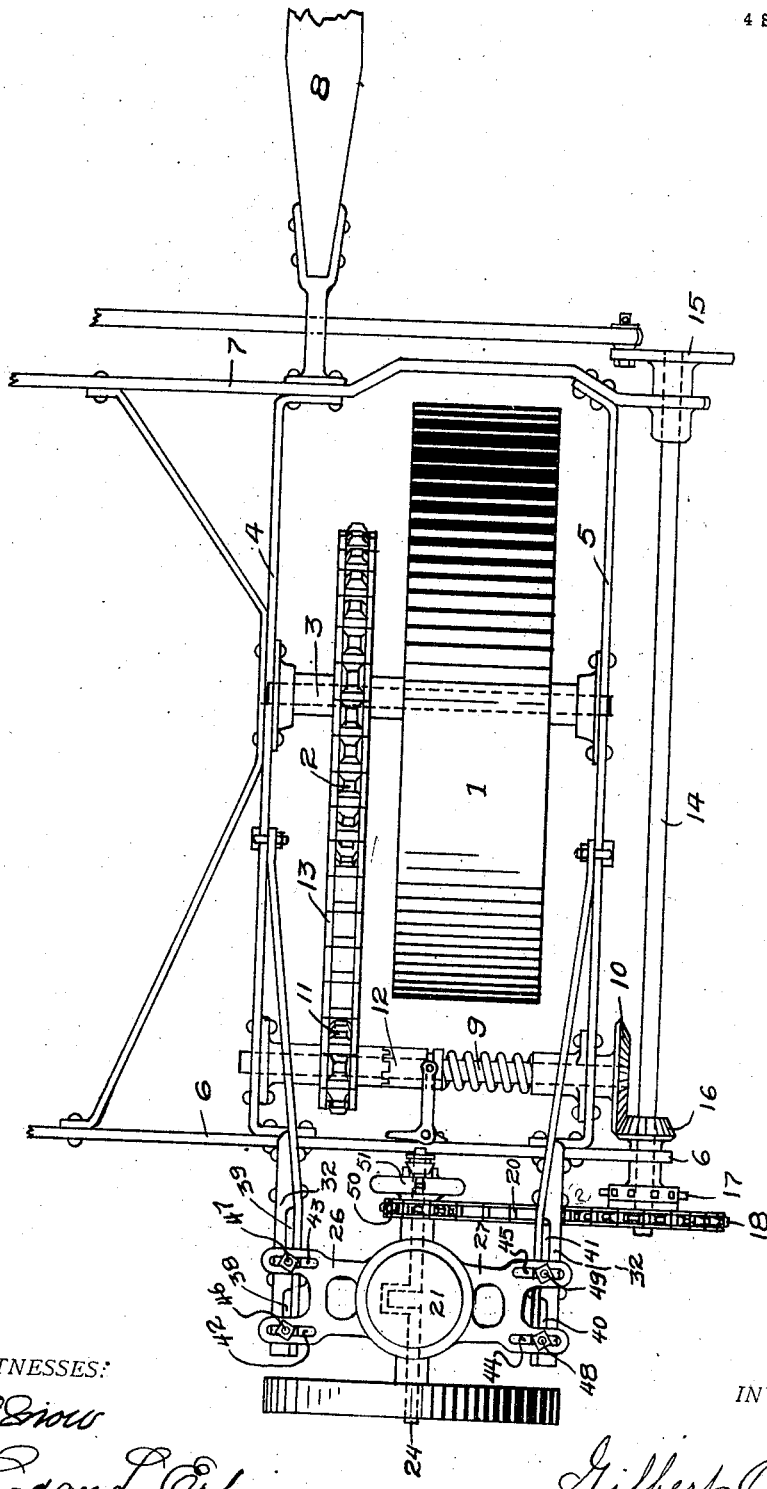
Figure 3:
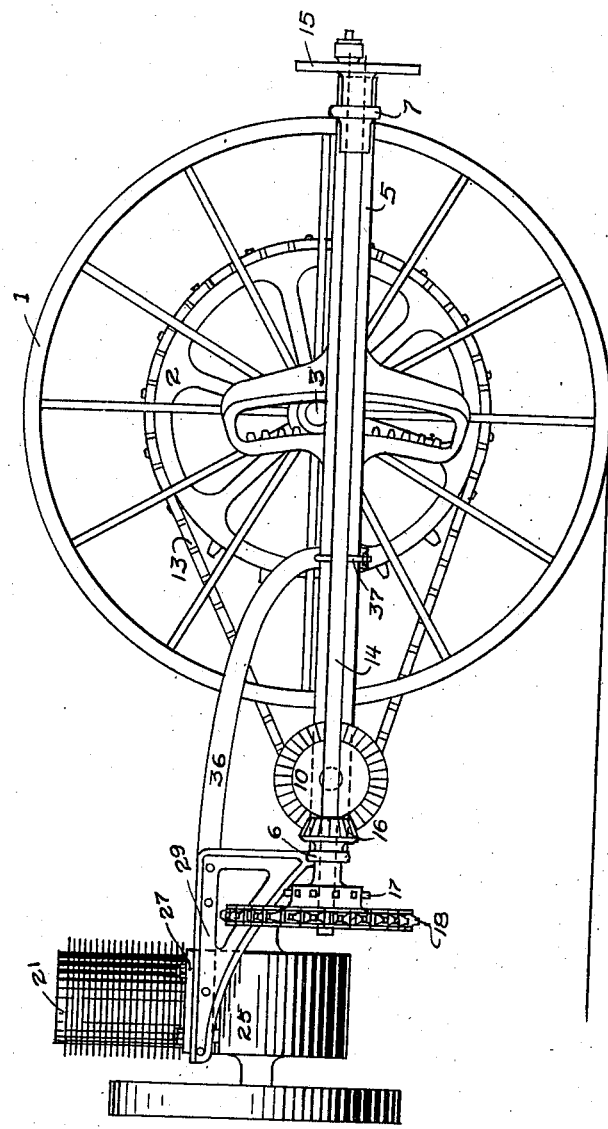

In the drawings: Figure 1, is a rear elevation of the improved implement. Fig. 2, is a plain view showing the main frame, pitman shaft, and traction wheel of the implement, together with our complete improvement and all operative connections thereof. Fig. 3, is a side elevation of the elementary construction illustrated in Fig. 2. Fig. 4 is a detail of construction showing a side view of a bracket and its truss, a portion being shown in section to more clearly set forth the method of attachment of the angular foot to rear member of the main frame. Fig. 5 is top view thereof. Fig. 6 is sectional view taken on the line 6—6 in Fig. 5. Fig. 7 is a sectional view of the angular foot, as attached to the main frame of a McCormick binder. Fig. 8 is a sectional view of a foot of modified construction for attachment to a Milwaukee binder.

Similar reference-numerals indicate like parts throughout the specification and the several views of the drawings.

The apparatus illustrated comprises a reaper and binder operatively equipped with an explosive motor and complete attachments therefor in accordance with the principles of our invention, however, it is not deemed essential that the complete harvester and binder receive a detailed description herein, the elementary construction shown in Fig. 2 being sufficient to set forth the application of our invention.

The traction wheel 1, and driving sprocket 2, are rigidly secured upon a shaft 3, which is rotatively mounted in the main frame. The main frame comprises the longitudinal members 4 and 5, and the transverse members 6 and 7 to which the said longitudinal members are securely riveted. The draft pole 8 is secured to the forward portion of the main frame and provides a means of transportation by horses. The countershaft 9 is transversely mounted in the longitudinal members of the main frame, and carries a bevel gear 10 rigidly secured thereto, and a driven sprocket 11 loosely mounted thereon. The spring clutch 12 provides a means whereby the sprocket 11 may be positively secured for rotation with the countershaft 9, or released therefrom at the instigation of the operator. The endless chain 13 extends from the driving sprocket 2 to the sprocket 11 and provides operative connection between same, whereby the driven sprocket 11 may be impelled from the driving sprocket 2, or conversely, as the circumstances may require.

The pitman shaft 14 is longitudinally mounted in the main frame, being journaled in the transverse members 6 and 7; and carries, at its forward end, the pitman wheel 15, by which the cycle blade is operated. A bevel gear 16, engaging the bevel gear 10, is secured upon said pitman shaft near its rear end, and at its extreme rear portion is mounted the sprockets 17 and 18 combined in a single casting, of which the sprocket 17 impels the endless chain 19, and the sprocket 18 is driven by the chain 20 extending from the motor.

The motor may be of any approved form, such as electric, steam, explosive, chemical, or heat, as may be desired, the type herein shown being a single cylinder explosive engine which is of light construction, and by reason of its economy of operation, and dependabilitiveness upon all occasions, is especially well adapted for this purpose, as well as the general utility purposes hereinbefore referred to. This motor comprises the usual members, namely, the cylinder 21, crank shaft 24, crank case 25, and such other parts as are necessary for its operation, the fuel supply reservoir and connections, the muffler, and the igniter system not being illustrated herein. The integral flanges 26 and 27 extend horizontally from either side of the upper portion of the crank-case 25 and depend upon the brackets 28 and 29 respectively. Each of said brackets comprises an upright member 30, and a concave brace 31 supporting a horizontal rail 32, the lower portion of said bracket terminating in an angular foot 33, the vertical member thereof being pierced and the horizontal member being provided with a slot 34, by which said foot is secured upon the main frame, at the point of the junction of the members 4 and 6, by means of the angle-bolt 35. The truss 36 is formed of any suitable material, channel steel being considered preferable, and is bent at a right angle at its forward end by which it may be secured to the member 4 of the main frame by means of an angle bolt 37, as shown in Fig. 6 of the drawings. However, the truss may be joined without said angle and be secured to the main frame by means of a U bolt, if desired. The rear portion of said truss extends along the entire length of the rail 32, being riveted thereto to reinforce same. The configuration of the brackets 28 and 29 provides longitudinal slots 38, 39, 40 and 41, and in the flanges 26 and 27 are provided the slots 42, 43, 44 and 45 a portion of each of which registers with a portion of the said bracket slots respectively, by which the engine is secured upon said brackets by means of the bolts 46, 47, 48 and 49. The said slots 38, 39, 40 and 41 provide a means for longitudinal adjustment of the motor to bring the driving sprocket 50 of the motor in alinement with the driven sprocket 18 on the pitman shaft; and the slots 42, 43, 44 and 45 provide a means for varying the transverse position of the engine to adjust the tension of the driving chain 20.

The driving sprocket 50 is mounted upon the forward portion of the crank shaft 24, and is positively secured with the loose element of a friction clutch 51 by means of which the said sprocket 50 may be rotatively engaged or disengaged with the crank shaft entirely within the control of the operator at all times. The friction clutch 51 may be of any desired form, a very simple construction being sufficient; and as its principles of operation are well known, no detailed description is necessary herein.

The above construction provides that the clutches 12 and 51 may be engaged to start the motor. When it is apparent to the operator that the motor is in operation, the clutch 12 may be released, the horses continuing to haul the implement over the ground, and the motor impelling the cutting, conveying, and binding mechanism. In event the motor should fail to operate, the clutch 51 may be released, disengaging the motor from the mechanism of the implement, and the clutch 12 may then be engaged, thereby driving the mechanism of the implement from the traction wheel 1 without loss of time to the implement while the engine is being repaired. However, in case the conditions of the ground render the labor of the horses excessive, the clutch 12 may be engaged while the engine is impelling the mechanism, thus causing the engine to also exert an impelling force upon the traction wheel, thereby rendering substantial aid to the horses.

Levers by which the clutches 12 and 51 are operated, as well as levers by which the speed of the motor may be varied, are arranged to be conveniently manipulated by the operator, but, as devices of this nature are well known, no description of same is considered essential herein.

The construction herein set forth has been designed in view of providing a device applicable to binders of any standard construction.

Fig. 7 shows a method by which the foot 33 may be secured upon the angular rear member 52 of the main frame of a McCormick binder, by means of the angle bolt 35, a block 53 being inserted within the angle of the member 52 to complete a rectangle.

In Fig. 8, a foot 54 is shown of modified construction, especially adapting it for application to binders having tubular main frames. The foot may be likewise modified to the conformity of the main frame of any implement of this class desired.

If desired the details of construction of the bracket may be altered by forming the truss integral with the bracket; the various portions of the bracket may be formed of suitable angle or channel steel and assembled. However, if desired, the entire bracket may be formed of suitable wrought iron pipe or standard structural steel, extending along the longitudinal members of the main frame to a suitable distance in the rear thereof whence it is upwardly turned and extended horizontally forward, thereby providing a support for the motor.

Under certain circumstances it may be found advisable to replace the square-jawed spring clutch 12 by a suitable friction clutch. This allows the operator to apply the motive power to the traction wheel without the sudden shock attending the use of a square-jawed clutch.

It is obvious from the foregoing, that modifications may be effected, within the scope of the appended claims, without departing from the true and original purport of this invention, therefore, we do not confine ourselves to the details of construction and application hereinbefore set forth.

Having thus described our invention, what we claim and desire to secure by Letters Patent of the United States, is the following:

1. In a combined motor and traction operated implement, the combination with a main frame, harvesting mechanism mounted thereon, a traction wheel mounted in said main frame, and means for transportation by horses, of an upwardly and rearwardly extending bracket secured to the rear portion of said main frame, a motor mounted upon said bracket, connecting means between said motor and the pitman shaft of said mechanism, a clutch controlling said connecting means, an auxiliary shaft connected to said pitman shaft, means connecting said auxiliary shaft to the drive wheel, and a clutch mounted upon said auxiliary shaft and adapted to control said connecting means to the drive wheel, substantially for the purposes set forth.

2. In a device of the character described, a main frame, a traction wheel connected therewith for supporting the same, harvesting mechanism mounted upon the main frame, means to operate the harvesting mechanism including a rotatable shaft extending longitudinally of the main frame, a counter-shaft disposed near and to one side of the first named shaft and having a clutch thereon, driving connecting means between the counter-shaft and the first named shaft, a motor mounted upon the main frame and including a crank shaft, said crank shaft having a second clutch thereon, a sprocket wheel loosely mounted upon the crank shaft and having rigid connection with a co-acting member of the second named clutch, the other co-acting member of the clutch being splined upon the crank-shaft for movement into and out of engagement with the first named co-acting member, a second sprocket wheel rigidly mounted upon the first named shaft, a sprocket chain connecting the first and second named sprocket wheels, a third sprocket wheel rigidly connected with the traction wheel for rotation therewith, a fourth sprocket wheel rotatably mounted upon the counter shaft and having rigid connection with one co-acting member of the first named clutch, and the other co-acting member of said second named clutch being splined upon the counter shaft for movement into and out of engagement with the other co-acting clutch member and a sprocket chain connecting the third and fourth sprocket wheels.

3. In a device of the character described, a main frame, an axle journaled through the main frame nearly intermediate the ends thereof, a traction wheel mounted upon the axle, a draft appliance attached to the forward end of the main frame, a motor including a driving shaft mounted upon the rear end of the main frame to counter balance said draft appliance, a clutch on the driving shaft, harvesting mechanism mounted on the main frame, a pitman shaft extending longitudinally of the main frame, a counter-shaft disposed near the actuating shaft and having a second clutch thereon, driving connecting means between the shafts, a sprocket wheel rigidly mounted upon said axle, a sprocket wheel rotatably mounted upon the counter-shaft and having rigid connection with a co-acting member of the second named clutch, the other co-acting member being splined upon the counter shaft for movement into and out of engagement with the first named co-acting member, a sprocket chain connecting said sprocket wheels, a third sprocket wheel rotatably mounted upon the driving shaft and having rigid connection with a co-acting member of the first named clutch, the other co-acting member of the first named clutch being splined upon the driving shaft for movement into and out of engagement with its co-acting member, a pair of sprocket wheels formed in a single casting and mounted upon said actuating shaft, a sprocket chain connecting the third named sprocket wheel and one of the sprocket wheels of said pair, and a sprocket chain forming driving connecting means between the other sprocket wheel of said pair and the harvesting mechanism.

4. In a device of the character described, a main frame, a traction wheel connected with the same for supporting it, harvesting mechanism mounted upon the main frame, a pitman shaft extending longitudinally of the main frame, a counter shaft disposed near the actuating shaft and disposed transversely of the main frame, said countershaft having a clutch thereon, driving connecting means between the counter shaft and the pitman shaft, a sprocket wheel rigidly connected with the traction wheel for rotation therewith, a sprocket wheel rotatably mounted upon the counter shaft and having rigid connection with a co-acting member of the clutch, the other co-acting member of the clutch being splined upon the counter shaft for movement into and out of engagement with its co-acting clutch member, a chain connecting the two sprockets, a pair of sprocket wheels formed in a single casting and rigidly mounted upon the pitman shaft, a sprocket chain connecting one sprocket wheel of said pair with operating parts of the harvesting mechanism, driving connecting means between the cutting implement of the harvesting mechanism and the actuating shaft, a motor mounted upon the main frame and including a driving shaft, a clutch on said driving shaft, a sprocket wheel rotatably mounted on the driving shaft and having rigid connection with a co-acting member of the second named clutch, the other co-acting member of the second named clutch being splined upon the driving shaft for movement into and out of engagement with its co-acting member, and a sprocket chain connecting the last named sprocket wheel and the other sprocket wheel of said pair.

In testimony whereof, we have hereunto set our hands and affixed our seals in the presence of two subscribing witnesses, this 19th day of November, 1908.

GILBERT O. HELVIG. [L. S.]
EDVEN DANIELSON. [L. S.]

Witnesses:
A. W. EWING,
MARY O'BRIEN.